UNITED STATES PATENT OFFICE.

HARRY PAULING, OF BRANDAU, AUSTRIA-HUNGARY.

PROCESS OF MANUFACTURING AMMONIUM FORMATE.

SPECIFICATION forming part of Letters Patent No. 776,543, dated December 6, 1904.

Application filed April 2, 1902. Serial No. 101,064. (No specimens.)

*To all whom it may concern:*

Be it known that I, HARRY PAULING, engineer of mines, a citizen of the Empire of Austria-Hungary, and a resident of Brandau, Bohemia, Austria-Hungary, (whose post-office address is House No. 200,) have invented certain new and useful Improvements in Processes of Manufacturing Ammonium Formate, of which the following is a specification.

The present invention relates to a process for the manufacture of ammonium formate from a gas or gas mixture containing hydrogen, nitrogen, and monoxid of carbon by synthesis, consisting in subjecting the mixture of gases, together with steam, to electric non-luminous discharges in the presence of porous contact-bodies, such as spongy platinum.

According to the methods hitherto in use ammonium formate could only be obtained from ammonia itself.

Ammonia has already been obtained by combining nitric oxid and hydrogen through the influence of spongy platinum or a similarly-acting porous contact substance according to the equation

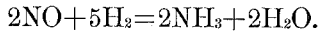

According to my new process instead of using a mixture of pure nitric oxid and pure hydrogen I employ a cheap mixture of nitric oxid and hydrogen with other gases and water-steam in order to obtain ammonium formate. These mixtures are exposed in the presence of porous contact substances to electric non-luminous or brush discharges. If such a mixture is exposed to non-luminous electric discharges alone, no ammonium formate is formed. If the mixture is exposed to the influence of porous contact substances alone, traces of ammonium formate may be found; but it is impossible to obtain any considerable quantity of ammonium formate in this way.

The new technical effect obtained by my new process—*i. e.*, by combining the action of porous contact substances with that of non-luminous electric discharges—lies in the fact that ammonium formate can be manufactured by it on a commercial scale from cheap gas mixtures, the condensing action of the contact substances being greatly reinforced by the action of the non-luminous electric discharges.

Of the gas mixtures mentioned above I prefer to use Dowson gas or a mixture of water-gas and nitrogen.

Dowson gas is a gas mixture obtained by blowing air and steam into incandescent anthracite masses, the composition of the gas mixture obtained being about as follows: hydrogen, fourteen per cent.; nitrogen, forty-three per cent.; monoxid of carbon, thirty-nine per cent.; carbon dioxid, four per cent. Total, one hundred per cent.

The pure water-gas has about the following composition: hydrogen, forty-eight per cent.; monoxid of carbon, forty-six per cent.; carbon dioxid, nitrogen, carbureted hydrogen, six per cent. Total, one hundred per cent.

Instead of using Dowson gas or a mixture of water-gas with nitrogen directly I may as well use a mixture of air and one of the gas mixtures mentioned above, the air having previously been exposed to electric discharges in order to transform the nitrogen contained in the air into nitric oxid.

In order to perform my new process, I subject one of the gas mixtures mentioned above, together with water-steam, to electric non-luminous or brush discharges in the presence of porous contact substances, such as spongy platinum, and I obtain ammonium formate according to the equation

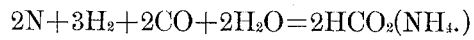

Any suitable apparatus may be used for the performance of my new process.

Having now particularly described and ascertained the nature of my said invention and in what manner the same is to be performed, I declare that what I claim is—

A process for the manufacture of ammonium formate by synthesis, consisting in subjecting a mixture of gases containing hydrogen, nitrogen and monoxid of carbon together with steam to electric non-luminous discharges in the presence of porous contact-bodies, substantially as described.

In testimony whereof I affix my signature in presence of two witnesses.

HARRY PAULING.

Witnesses:
  HENRY HASPER,
  WOLDEMAR HAUPT.